Figure 1:
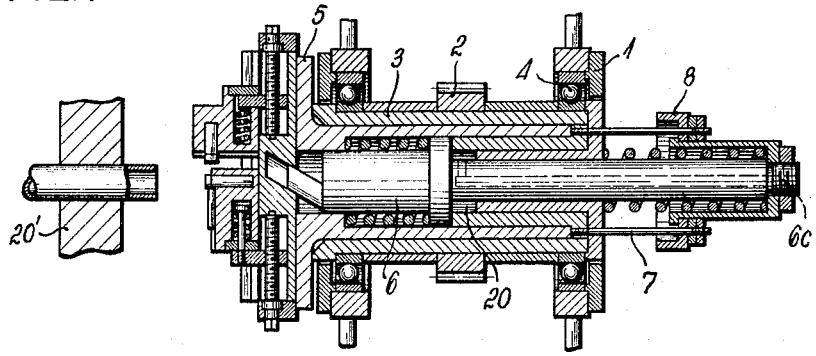

Oct. 25, 1966  F. RIEDEL  3,280,672

DEVICE FOR MACHINING THE ENDS OF PIPES

Filed July 1, 1964

United States Patent Office 3,280,672
Patented Oct. 25, 1966

3,280,672
DEVICE FOR MACHINING THE ENDS OF PIPES
Franz Riedel, Solingen, Germany, assignor to Th. Kieserling & Albrecht, Solingen, Germany
Filed July 1, 1964, Ser. No. 379,601
16 Claims. (Cl. 82—2)

The present invention relates to machining devices and in particular to devices for machining the end face of an open end of a pipe.

Devices of this latter type are used in the manufacture of boiler pipes and the like.

During the manufacture of such pipes it is essential to provide them with perfectly flat end faces, and in addition it is essential to clear burrs.

The output capabilities of modern installations for manufacturing pipes is truly remarkable, and attempts are always made to increase this output. It is essential, however, that machines which treat the pipe during or subsequent to the manufacture thereof be capable of performing their operations as fast as the pipe is capable of being manufactured so that all of the operations can proceed at the desired high speed without any one operation slowing up the entire train of operations. For example, the manufacture of pipe of the above type includes such operations as cutting the pipe into suitable lengths, removing burrs, testing the fluid tightness of the pipe, cutting threads into the pipe, etc. The cutting of the pipe into suitable lengths provides undesired burrs at the inner and outer peripheries of the open ends of the pipe lengths, and in addition the end faces of such pipes are not perfectly flat. Therefore, it is necessary, before the pipe is transported to a pipe testing machine, to machine the end faces of the pipes to render them perfectly flat.

While with conventional gas or water pipes it is sufficient to machine the pipe ends in such a way as to provide them with beveled peripheries during the clearing of burrs, with pipes which are to be used in boilers it is essential that besides clearing of burrs the end faces of the pipes be perfectly flat. It has therefore been customary to machine the end faces of such pipes so that they are perfectly flat, and then the burrs at the inner and outer peripheries of the pipe ends were cleared by hand. Therefore, the continuity in the operations has been unavoidably interrupted by the necessity of removing burrs by hand.

It is accordingly a primary object of the present invention to provide a device which will not only machine the end of a pipe but which will in addition clear burrs in a fully automatic manner so that the continuous transportation of the pipes throughout the several operations required to be performed on them can be achieved.

In particular it is an object of the present invention to provide a device which responds automatically to the termination of the machining of the end face of a pipe to set into operation structure for immediately and quickly removing burrs from the end face.

It is furthermore a further objective of the present invention to provide a device of the above type which is adjustable so that it can be adapted for use with pipes of different sizes.

Furthermore, it is an object of the invention to provide a device with an exceedingly simple structure for responding to a fluid under pressure to bring about the desired sequence of operations.

Furthermore, it is an object of the present invention to provide a structure which applies the burr clearing tools against the pipe with a yieldable pressure.

Also, it is an object of the invention to provide a structure of the above type which is exceedingly simple, rugged, and reliable in operation.

With the above objects in view the invention includes, in a device for machining an end face of an open end of a pipe which is situated at a predetermined location, a support means and a spindle means supported by the support means for axial movement from a predetermined initial position to a predetermined limit position. The spindle means carries a carriage means mounted on the spindle means for radial movement relative thereto, and a tool means is carried by the carriage means for machining an end face the open end of a pipe, which is situated at the above predetermined location, during axial movement of the spindle means from its initial to its limit position, and for clearing burrs from the inner and outer peripheries of the machined end face of the pipe during subsequent radial movement of the carriage means relative to the spindle means when the latter is at its limit position. A particular feature of the invention resides in the provision of a means for advancing the spindle means from its initial to its limit position, so that the tool means will during this part of the operation machine the end face of the pipe to render it perfectly flat, and for then automatically, in response to arrival of the spindle means at its limit position, displacing the carriage means radially so that the tool means will clear the burrs at the inner and outer peripheries of the end face immediately subsequent to machining of the end face.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal sectional elevation of one possible embodiment of a structure according to the invention, the parts being shown in FIG. 1 in their initial rest positions.

Figure 2:
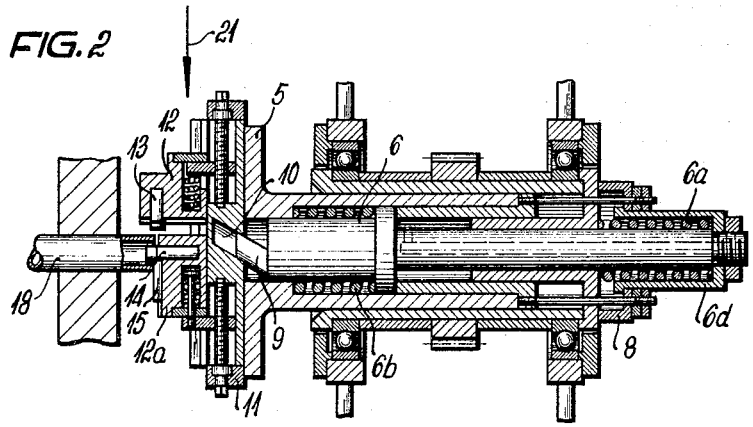
Figure 3:
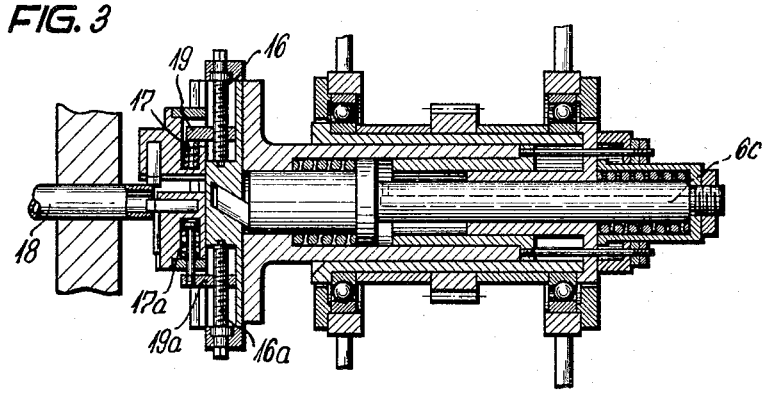

FIG. 2 shows the structure of FIG. 1 after it has been adjusted for a particular pipe and at the moment when the spindle has reached its limit position when the machining of the end face of the pipe has been completed and the clearing of burrs is about to take place; and FIG. 3 illustrates the structure of FIG. 2 at a subsequent stage in the operations during clearing of burrs from the inner and outer peripheries of the machined end face.

Referring now to FIG. 1 there is shown therein the machine bed 1 which carries bearings 4 which support a sleeve 3 for rotary movement, this sleeve 3 being in the form of a hollow drive shaft and acting as a support means for the structure of the invention. A gear 2 surrounds and is fixed to the sleeve 3 so that through a suitable transmission from a suitable source of power the gear 2 and the sleeve 3 can be rotated. The support means 3 supports a spindle means 5 for axial movement to the left from the initial position shown in FIG. 1 to the limit position shown in FIGS. 2 and 3, and this spindle 5 has the configuration of a hollow cylinder and is telescopically situated in the support means 3. Through an unillustrated key and keyway or the like the spindle means 5 is constrained to rotate with the support means 3 but is free to move axially relative thereto. The hollow interior of the cylindrical spindle means 5 serves as a cylinder for receiving a piston means 6. As apparent from the drawings the hollow spindle 5 has in its interior an elongated portion of enlarged diameter extending between a pair of annular shoulders of the spindle means 5 which are directed toward each other, and the piston means 6 is shown in FIGS. 1 and 2 engaging the right annular shoulder at the right end of the enlarged interior portion of the spindle 5, a spring 6b (FIG. 2) engaging the left shoulder and the piston 6 for yieldably maintaining the latter against the right shoulder, as viewed in the drawings. A pair of threaded studs 7 are connected with the spindle means 5, extend axially beyond the latter through suitable openings in the right end wall of the hollow shaft or sleeve 3, and are threadedly connected to an annular stop means 8 adapted to engage the support means 3 for determining the limit position of the spindle means 5 which is shown in FIGS. 2 and 3, this stop means 8 being spaced from the support means 3 in the initial position of the parts shown in FIG. 1. By turning the studs 7 it is possible to adjust the distance through which the spindle means 5 moves axially relative to the support means 3 before reaching the limit position.

The left end of the piston means 6, fixedly carries an elongated projection 9 extending at an acute angle with respect to the axis of the spindle means 5. This inclined projection 9 extends into an elongated cutout 10 which is formed in a carriage means 11 which is mounted on the spindle means 5 for radial movement relative thereto, and the elongated cutout 10 is inclined with respect to the axis of the spindle means 5 at the same angle as the projection 9 so as to form an extension of the latter, the right open end of the cutout 10, as viewed in the drawings, communicating with the hollow interior of the spindle means 5 and receiving at all times part of the projection 9, as is apparent from the drawings.

This carriage means 11 carries a tool means 13–15 which operates in a manner described below and the tool means 13–15 is directly mounted on a pair of tool carriers 12 and 12a which are slidably supported in suitable ways of the carriage means 11 also for radial movement relative to the axis of the spindle means 5. An adjusting means is provided for adjusting the positions of the carriers 12 and 12a on the carriage means 11, and in the illustrated example the adjusting means includes a pair of manually turnable screw means 16 and 16a (FIG. 3) turnably mounted on the carriage means and threaded through a pair of stop means 19 and 19a guided by the carriage means 11 for radial movement in response to turning of the adjusting screws 16 and 16a, respectively. While the stop 19 is a simple plate, the stop 19a includes a pin extending into a bore of the carrier 12a and terminating in this bore in a head end engaged by one end of a spring 17a the opposite end of which urges a portion of the carriage 12a against the stop 19a. A similar spring 17 in a bore of the tool carrier 12 engages the stop 19 and urges a portion of the carrier 12 against the upper face of the stop 19, as viewed in the drawings. Thus, it is clear that the springs 17 and 17a urge both of the carriers 12 and 12a downwardly as viewed in the drawings, respectively.

The piston means 6 has an elongated extension projecting through and beyond the right end of the support means 3 where the extension of the piston means carries a second stop means 6d surrounded by the stop means 8 and having at its left end, as viewed in the drawings, an outwardly directed flange which engages the stop means 8 in the position of the parts shown in FIGS. 1 and 2 so as to limit the movement of the piston means to the right, as viewed in the drawings, and a further spring 6a is coiled about this extension of the piston means 6 and engages the support means 3 and the stop means 6d so that it is clear that the forces of the springs 6a and 6b augment each other to maintain the piston means 6 in the position illustrated in FIGS. 1 and 2 relative to the support means 3. The piston means 6 as formed with an elongated bore 6c communicating with a chamber 20 in the interior of the spindle means 5, this chamber 20 being limited between the end face of the piston which engages the right shoulder of the enlarged interior portion of the spindle means 5 and an end face of a tubular inner projection of the support means 3 which telescopically surrounds the right extension of the piston means 6 and which extends slidably into the interior of the spindle means 5, the slidable engagement between the extension of the piston means 6, on the one hand, and the spindle means 5, on the other hand, with this inwardly directed tubular extension of the support means 3 being maintained fluid-tight with any suitable sealing glands. The right end of the extension of the piston means 6 communicates in any suitable way with a source of fluid under pressure adapted to enter through the bore 6c into the chamber 20, and the connection of the piston means to the fluid under pressure is such that the piston can rotate with the spindle and the sleeve 3 while maintaining its fluid-tight communication with the source of fluid under pressure.

The above-described structure operates in the following manner:

A pipe 18 is shown situated by any suitable structure 20′ at a predetermined location where its right open end is adapted to be treated with the structure of the invention. With the parts in the position shown in FIG. 1 the screws 16 and 16a are adjusted so that when the spindle 5 advances to the left the burr clearing tool 13 will be situated outside of the pipe 18 while the burr clearing tool 14 will enter into the interior of the pipe 18, and it will be noted that for this purpose the stop 19 has been raised by the screw 16 from the elevation shown in FIG. 1.

With the parts thus adjusted a suitable valve is actuated so that the fluid under pressure will communicate with the interior of the chamber 20 through the bore 6c, and, of course, the machine has been turned on so that the support means 3 and all of the structure carried thereby is rotating about the axis of the spindle means 5. The fluid under pressure in the chamber 20 acts on the piston means 6 to displace the latter to the left relative to the support means 3, and because of the action of the spring means 6a, 6b the spindle means 5 is displaced from its initial position of FIG. 1 toward its limit position of FIGS. 2 and 3 together with the piston means 6 which at this time does not move with respect to the axially advancing spindle means 5. As a result the tool 15 moves into engagement with and machines the end face of the pipe 18 so that this end face is rendered perfectly flat. These operations continue in this way until the stop means 8 engages the support means 3 so as to terminate movement of the spindle means 5 to the left and thus determine the limit position thereof.

As soon as the stop means 8 engages the support means 3 the fluid under pressure which still acts on the piston means 6 now displaces the latter in opposition to the spring means 6a, 6b so that now the second stop means 6d moves to the left with respect to the stop means 8 and approaches the support means 3. Since the spindle means 5 is prevented from further movement by the stop means 8, the springs 6a and 6b yield at this time, and at this time the parts move from the position of FIG. 2 into the position of FIG. 3. The movement of the piston 6 to the left relative to the spindle means 5 in the above-described fully automatic manner upon the arrival of the spindle means 5 at its limit position shown in FIG. 2 advances the projection 9 further into the cutout 10 so that the carriage means 11 together with all of the structure carried thereby is radially moved in the direction of the arrow 21. As a result the burr-clearing tools 13 and 14 move downwardly respectively into engagement with the outer and inner peripheries of the end face of the pipe 18 which has just been machined by the tool 15, so that the burrs are automatically cleared from the outer and inner peripheries in this manner. It is to be noted that the projection 9 while advancing into the cutout 10 continues to move the carriage means 11 in the direction of the arrow 21 after the tools 13 and 14 respectively engage the outer and inner peripheries of the machined end face of the pipe 18 so that the stops 19 and 19a are displaced in opposition to the springs 17 and 17a away from the portions of the carriers 12 and 12a which normally engage these stops and thus the burr-clearing tools 13 and 14 are urged against the outer and inner peripheries of the end face of pipe 18 not by any positive feed but solely by the pressure of the springs 17 and 17a which yield during movement of the stops 19 and 19a away from the portions of the carriers normally engaged thereby during the continued radial movement of the carriage means 11 after the tools 13 and 14 respectively engage the outer and inner peripheries of the end face of the pipe 18 which has just been machined by the tool 15.

The principal advantage achieved with the structure of the invention is that the removal of the burrs takes place in a fully automatic manner in response to the arrival of the spindle means 5 at its limit position, so that immediately after the end face of the pipe is machined the burrs are automatically removed as a continuation of the very same machine process which is applied to the end face of the pipe.

Moreover, the assembly of the piston means 6 with the spindle means by way of the springs 6a and 6b provides an exceedingly simple hydraulic or pneumatic structure since when a valve is opened to introduce fluid under pressure the operations will proceed as described above, whereas when the chamber 20 is returned to atmospheric pressure the springs will immediately return the parts to their initial positions. Furthermore, the extent to which the springs 17 and 17a are compressed so as to determine the pressure with which the tools 13 and 14 are applied against the inner and outer peripheries of the end face, respectively, is determined by the extent to which the stop means 6d moves from the position shown in FIG. 2 until the position shown in FIG. 3 where it engages the support means 3.

The above-described structure of the invention can, of course, be included in a continuously operable pipe-end machine installation where the pipe and the structure which machines the end thereof move continuously along a circular path during performance of the above-described operations.

It will be understood that each of the elements described above, or two or more together, may also find a useful application in other types of machine tools differing from the types described above.

While the invention has been illustrated and described as embodied in tools for machining pipe ends, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A device for machining an open end of a pipe situated at a predetermined location, comprising, in combination, spindle means; support means supporting said spindle means for axial movement; single carriage means carried by said spindle means for radial movement relative thereto; tool means carried by said single carriage means for machining the end face of a pipe at said location during axial movement of said spindle means to a given limit position relative to said support means and for clearing burrs from the interior and exterior of the pipe at the end face thereof upon radial movement of said single carriage means relative to said spindle means when the latter reaches said limit position relative to said support means; means operatively connected to said spindle means for advancing the latter axially up to said limit position while said tool means machines the end face of a pipe at said location; means for stopping axial movement of said spindle means when the latter reaches said limit position; and means carried by said spindle means and cooperating with said carriage means for automatically displacing said single carriage means radially with respect to said spindle means when the latter reaches said limit position so that said tool means automatically clears burrs at the interior and exterior of the pipe at the machined end face thereof immediately after the machining of the end face is completed.

2. A device for machining an end face at the open end of a pipe situated at a predetermined location, comprising, in combination, support means; elongated hollow spindle means carried by said support means for axial movement relative thereto; first stop means carried by said spindle means and engaging said support means for limiting the extent of axial displacement of said spindle means relative to said support means, said spindle means having an initial position where said first stop means is spaced from said support means and having a final position where said first stop means engages said support means; piston means located in said hollow spindle means for advancing the latter axially from said initial to said final position when a fluid under pressure acts on said piston means, said piston means moving axially relative to said hollow spindle means in response to the force of the fluid under pressure when said spindle means reaches said final position; second stop means carried by said piston means at a location spaced from said support means during movement of said piston means and spindle means up to said final position of said spindle means, said second stop means thereafter engaging said support means to limit the extent of movement of said piston means relative to said spindle means after the latter has reached said final position thereof; carriage means carried by said spindle means for axial movement therewith and for radial movement relative thereto; and tool means carried by said carriage means for machining an end face of an open end of a pipe at such location during movement of said spindle means from said initial to said final position thereof and for clearing burrs from the inner and outer peripheries of the machined end face during radial movement of said carriage means relative to said spindle means; and means operatively connected to said carriage means and said piston means for moving said carriage means radially relative to said spindle means upon movement of said piston means relative to said spindle means when the latter reaches said final position and until said second stop means engages said support means.

3. A device as recited in claim 2 and wherein a spring means acts on said piston means for maintaining said piston means at a predetermined position relative to said spindle means until said first stop means engages said support means when said spindle means reaches said final position thereof, said spring means yielding during movement of said piston means relative to said spindle means until said second stop means engages said support means.

4. A device as claimed in claim 3 and wherein said second stop means engages said first stop means and moves therewith during movement of said spindle means from said initial to said final position thereof, said second stop means being connected to said piston means and said first stop means being connected to said spindle means, and said spring means including a pair of springs one of which is in said hollow spindle means in engagement with the latter and said piston means and the other of which is at the exterior of said support means engaging the latter and said second stop means to yieldably oppose movement of said second stop means toward said support means.

5. A device for machining an end face at an open end of a pipe situated at a predetermined location, comprising, in combination, spindle means; support means supporting said spindle for axial movement from a predetermined initial position to a predetermined limit position; single carriage means carried by said spindle means for radial movement relative thereto; tool carrier means supported by said single carriage means for movement relative thereto; adjusting means operatively connected to said tool carrier means for adjusting the latter on said single carriage means; tool means carried by said tool carrier means for machining an end face at the opposite ends of a pipe at said location during axial movement of said spindle means from said initial to said limit position and for clearing burrs from the inner and outer peripheries of the machined end face during radial movement of said single carriage means relative to said spindle means; means operatively connected to said spindle and single carriage means for first advancing said spindle means from said initial to said limit position thereof, so as to machine the end face of the pipe; means for stopping axial movement of said spindle means when the latter reaches said limit position; and means carried by said spindle means and cooperating with said carriage means for then automatically displacing said single carriage means radially relative to said spindle means as soon as the latter reaches said limit position for automatically clearing the burrs immediately subsequent to machining of the end face.

6. A device as recited in claim 5 and wherein said single carriage means supports said tool carrier means for radial movement relative to said spindle means and wherein said adjusting means includes a rotary screw turnably carried by said single carriage means and operatively connected to said tool carrier means for adjusting the latter relative to said single carriage means.

7. A device for machining an end face of an open end of a pipe situated at a predetermined location, comprising, in combination, support means; spindle means carried by said support means for axial movement from a predetermined initial position to a predetermined limit position; carriage means carried by said spindle means for radial movement relative thereto; tool means carried by said carriage means for machining an end face of an open end of a pipe at said location during axial movement of said spindle means from said initial to said limit position and for clearing burrs from the inner and outer peripheries from the machined end face during radial movement of said carriage means relative to said spindle means; means operatively connected to said spindle means and carriage means for first displacing said spindle means axially from said initial to said limit position so as to machine the end face of the pipe and for then automatically displacing said carriage means radially relative to said spindle means as soon as said spindle means reaches said limit position for clearing the burrs from the machined end face immediately subsequent to machining of the end face; and spring means urging said tool means against the inner and outer peripheries of the end face of the pipe during clearing of burrs by said tool means.

8. A device for machining an end face at an open end of a pipe situated at a predetermined location, comprising, in combination, support means; elongated hollow spindle means supported by said support means for axial movement from an initial position to a predetermined limit position; stop means carried by said spindle means at a location spaced from said support means when said spindle means is at said initial position thereof, said stop means approaching said support means during movement of said spindle means toward said limit position and engaging said support means to prevent further movement of said spindle means when said spindle means reaches said limit position; piston means in said hollow spindle means for displacing the latter from said initial to said limit position when a fluid under pressure acts on said piston means, said piston means responding to the pressure of the fluid acting on said piston means to move relative to said spindle means only subsequent to the moment when said stop means engages said support means when said spindle means reaches said limit position; carriage means carried by said spindle means for radial movement relative thereto and formed with an elongated cutout communicating at one end with the interior of the hollow spindle means and inclined at an angle to the axis of said spindle means; an elongated projection fixed to said piston means aligned with and located adjacent to said cutout and inclined at the same angle as the latter relative to the axis of said spindle means, so that when said piston means moves relative to said spindle means subsequent to arrival of said spindle means at said limit position said projection enters into said cutout for automatically displacing said carriage means relative to said spindle means in response to movement of said piston means relative to said spindle means; and tool means carried by said carriage means for machining the end face at an open end of a pipe at said location during axial movement of said spindle means from said initial to said limit position and for clearing burrs from the inner and outer peripheries of the machined end face during radial movement of said carriage means resulting from displacement of said piston means relative to said spindle means upon arrival of the latter at said limit position, so that the burrs are cleared from the machined end face automatically and immediately subsequent to the machining of the end face of the pipe.

9. A device for machining an end face at an open end of a pipe situated at a predetermined location comprising, in combination, hollow cylindrical support means; hollow cylindrical spindle means situated within and supported by said hollow cylindrical support means for axial movement relative thereto from a predetermined initial position to a predetermined limit position, said hollow cylindrical spindle means being formed in its interior with a pair of axially spaced annular shoulders directed toward each other and defining the ends of an elongated interior portion of said spindle means which is of a larger diameter than the remainder of the interior of said spindle means; stop means carried by said spindle means at a location spaced from said support means when said spindle means is in said initial position thereof and approaching said support means during movement of said spindle means from said initial toward said limit position thereof, said stop means engaging said support means to determine said limit position of said spindle means; piston means in said spindle means at said interior, larger diameter portion thereof normally in engagement with one of said shoulders; spring means engaging the other of said shoulders and said piston means for yieldably maintaining the latter in engagement with said one shoulder, so that a fluid under pressure acting on said piston means and said support means will displace said piston means and said spindle means therewith until said spindle means reaches said limit position whereupon said fluid under pressure will then displace said piston means in opposition to said spring means relative to said spindle means away from said one shoulder and toward said other shoulder; carriage means carried by said spindle means at an end thereof nearer to said other shoulder than said one shoulder for radial movement relative to said spindle means, said carriage means being formed with an elongated cutout extending at an acute angle with respect to the axis of said spindle means and having an open end communicating with the hollow interior of said spindle means; an elongated projection forming an extension of said cutout, having one end located in said open end of said cutout, and having an opposite end fixed to said piston means so that when the latter is displaced away from one said shoulder toward said other shoulder said projection enters to an increasing extent into said cutout for displacing said carriage means radially with respect to said spindle means; and tool means carried by said carriage means for machining an end face at an open end of a pipe at said location during axial movement of said spindle means to said limit position thereof and for then automatically clearing burrs from the inner and outer peripheries of the machined end face during the immediately subsequent radial movement of said carriage means relative to said spindle means.

10. A device as recited in claim 9 and wherein a second stop means is connected to said piston means and engages said support means to limit the extent of movement of said piston means relative to said spindle means.

11. A device as recited in claim 10 and wherein a second spring means is situated between said support means and second stop means for acting through the latter on said piston means to augment the force with which said piston means is urged against said one shoulder.

12. A device as recited in claim 11 and wherein both of said stop means engage each other until said piston means is displaced relative to said spindle means immediately subsequent to arrival of said spindle means at said limit position thereof.

13. A device as recited in claim 9 and wherein said support means is in the form of a rotary sleeve which transmits rotation to said spindle means so that a drive connected to said sleeve for rotating the latter will be transmitted to said sleeve to said spindle means for rotating said spindle means.

14. A device for machining an end face of an open end of a pipe situated at a predetermined location, comprising, in combination, support means; spindle means carried by said support means for axial movement from a predetermined initial position to a predetermined limit position; carriage means carried by said spindle means for radial movement relative thereto; a pair of tool carriers carried by said carriage means for radial movement relative to said spindle means; a pair of stop means carried by said carriage means for radial movement relative thereto; a pair of adjusting means carried by said carriage means and operatively connected to said pair of stop means, respectively, for adjusting the positions of the latter relative to said carriage means; a pair of spring means engaging said pair of stop means and said pair of tool carriers for urging portions of the latter into engagement with said pair of stop means so as to determine the positions of said tool carriers relative to said carriage means; a pair of burr clearing tools respectively carried by said tool carriers for clearing burrs from the inner and outer peripheries, respectively, of an end face of an open end of a pipe at said location; a third tool carried by one of said carriers for machining the end face of the pipe during axial movement of said spindle means to said limit position thereof; and means for displacing said spindle means from said initial to said limit position thereof and for then displacing said carriage means radially relative to said spindle means to place said pair of burr clearing tools respectively in engagement with the inner and outer peripheries of the machined end face and for continuing radial displacement of said carriage means to move said pair of stop means in opposition to said pair of spring means away from said portions of said carriers which normally engage said pair of stop means so that said burr clearing tools are urged against said peripheries by said pair of spring means.

15. A device as recited in claim 14 and wherein said pair of adjusting means include, respectively, a pair of manually turnable screws carried by said carriage means and threadedly engaging said pair of stop means.

16. A device for machining an open end of a pipe located at a predetermined location comprising, in combination, first tool means for machining the end face of a pipe at said location; second tool means for clearing burrs from the interior and exterior of the pipe at the end face thereof; single carrier means carrying both said first and said second tool means movable in axial direction of said pipe and turnably about the axis of the latter and carrying at least said second tool means movably in direction transverse to said axis; a single moving means operatively connected to said single tool carrier means for moving the latter in said axial direction to a position in which said first tool means machines the end face of said pipe and for then automatically moving at least said second tool means carried by said single tool carrier means in said transverse direction so that said second tool means automatically clears burrs at the interior and exterior of the pipe at the machined end thereof immediately after the machining of the end of the pipe is completed; and means for rotating said single tool carrier means about said axis.

References Cited by the Examiner
UNITED STATES PATENTS

| | | | |
|---|---|---|---|
| 2,030,562 | 2/1936 | Barnes et al. | 82—20 |
| 3,011,368 | 12/1961 | Hayes | 77—4 |

FOREIGN PATENTS 902,167  7/1962  Great Britain.

WILLIAM W. DYER, Jr., *Primary Examiner.*

LEONIDAS VLACHOS, *Examiner.*